United States Patent
Humpenoeder et al.

(10) Patent No.: US 10,300,874 B2
(45) Date of Patent: May 28, 2019

(54) PASSENGER VEHICLE HAVING A FRONT-END CARRIER

(71) Applicant: Daimler AG, Stuttgart (DE)

(72) Inventors: Jens Humpenoeder, Ulm (DE); Robin Kaiser, Renningen (DE); Thomas Metzner, Calw Altburg (DE); Joerg Russ, Altdorf (DE)

(73) Assignee: Daimler AG, Stuttgart (DE)

( * ) Notice: Subject to any disclaimer, the term of this patent is extended or adjusted under 35 U.S.C. 154(b) by 10 days.

(21) Appl. No.: 15/572,089

(22) PCT Filed: Feb. 23, 2016

(86) PCT No.: PCT/EP2016/000309
§ 371 (c)(1),
(2) Date: Nov. 6, 2017

(87) PCT Pub. No.: WO2016/177440
PCT Pub. Date: Nov. 10, 2016

(65) Prior Publication Data
US 2018/0134242 A1 May 17, 2018

Related U.S. Application Data

(63) Continuation of application No. PCT/EP2016/000309, filed on Feb. 23, 2016.

(30) Foreign Application Priority Data

May 7, 2015 (DE) .................. 10 2015 005 925

(51) Int. Cl.
*B60R 19/18* (2006.01)
*B60R 19/34* (2006.01)

(52) U.S. Cl.
CPC .............. *B60R 19/18* (2013.01); *B60R 19/34* (2013.01); *B60R 2019/1833* (2013.01)

(58) Field of Classification Search
CPC .. B60R 19/18; B60R 19/34; B60R 2019/1833
(Continued)

(56) References Cited

U.S. PATENT DOCUMENTS 7,681,700 B2 * 3/2010 Ginja ................... B60R 19/18
188/377
7,681,770 B2 3/2010 Kanai
(Continued)

FOREIGN PATENT DOCUMENTS

DE         103 32 969 A1    2/2005
DE     10 2005 025 353 A1   12/2005
(Continued)

OTHER PUBLICATIONS

PCT/EP2016/000309, International Search Report dated May 25, 2016 (Three (3) pages).

*Primary Examiner* — Pinel E Romain
(74) *Attorney, Agent, or Firm* — Crowell & Moring LLP

(57) ABSTRACT

A front-end carrier for a passenger vehicle is disclosed. The front-end carrier has at least one cross member element and at least two lateral strut elements which are connected to one another via the cross member element and extend downward in the vertical direction of the vehicle away from the cross member element. Via the strut elements, the front-end carrier can be supported on a main longitudinal support plane of the passenger vehicle. At least one further load plane is above the main longitudinal support plane and below the cross member element.

5 Claims, 5 Drawing Sheets

(58) Field of Classification Search
USPC .................................................. 296/187.09
See application file for complete search history.

(56) References Cited

U.S. PATENT DOCUMENTS

| | | | | |
|---|---|---|---|---|
| 2010/0244470 | A1* | 9/2010 | Wacker | B60R 19/18 |
| | | | | 293/132 |
| 2013/0292969 | A1* | 11/2013 | Metzner | B62D 21/152 |
| | | | | 296/187.09 |
| 2017/0088183 | A1* | 3/2017 | Yamada | B60R 19/24 |
| 2017/0327065 | A1* | 11/2017 | So | B60R 19/34 |

FOREIGN PATENT DOCUMENTS

| | | |
|---|---|---|
| DE | 10 2010 012 123 A1 | 12/2010 |
| DE | 10 2010 054 917 A1 | 7/2011 |
| DE | 10 2014 019 298 A1 | 6/2015 |
| EP | 1 293 389 A1 | 3/2003 |
| EP | 1 942 033 A1 | 7/2008 |
| FR | 2 895 341 A1 | 6/2007 |
| FR | 2 896 222 A1 | 7/2007 |
| WO | WO 2011/058152 A1 | 5/2011 |

\* cited by examiner

PASSENGER VEHICLE HAVING A FRONT-END CARRIER

BACKGROUND AND SUMMARY OF THE INVENTION

The invention relates to a passenger vehicle.

DE 10 2010 054 917 A1 discloses a front-end carrier which has a cross member element and at least two lateral strut elements which are connected to each other via the cross member element and extend downwards in the vertical direction of the vehicle from the cross member element and are connected to each other via a further cross member element. A cooling module is accommodated between the strut elements.

WO 2011/058152 A1 discloses a vehicle, in the front region of which a flexible cross member of a bumper is connected via energy absorption elements, also referred to as crash absorbers or crash boxes, to longitudinal supports of a main longitudinal support plane arranged behind. Lateral strut elements project downwards away from the bumper-flexible cross member, the strut elements being connected at their lower end to a lower cross member.

U.S. Pat. No. 7,681,770 B2 discloses a motor vehicle having a bumper arrangement which comprises a flexible cross member, upstream of which an absorber element, which can be deformed in an energy-absorbing manner in the event of impact on the front of the vehicle, is arranged. This extends downwards away from the bumper-flexible cross member to the level of a motor support and over a significant width of the front of the vehicle.

Modern vehicles are often designed to be relatively flat in the front region which gives the vehicles a sporty look. In this case, their main longitudinal support plane having the bumper-flexible cross member is arranged at a lower height from the road, just as frequently for smaller motor vehicles as, for example, for motor vehicles with high ground clearance and a high slope angle, for example off-road vehicles or pickup trucks. Therefore, in the case of such a low front structure, there is the risk that, in the event of a collision with a large/high motor vehicle, the crash structure of the main longitudinal support plane of the vehicle, in which main longitudinal support plane the bumper-flexible cross member is also located, is not activated with the relatively low front structure and what is known as driving underneath occurs, which increases the risk of injury to the occupants or at least increases the loads acting on them.

The object of the present invention is to create a passenger vehicle by means of which a particularly advantageous accident performance of the passenger vehicle can be achieved.

The passenger vehicle has a front-end carrier having at least one cross member element and at least two lateral front strut elements which are connected to one another via the cross member element and extend downwards in the vertical direction of the vehicle away from the cross member element. Furthermore, a first longitudinal support plane is provided, in which lateral longitudinal supports and associated energy absorption elements, which are at least indirectly connected to a flexible cross member of a bumper which extends at least substantially in the transverse direction of the vehicle, are arranged. This first longitudinal support plane is arranged below the front-end carrier as seen in the vertical direction of the vehicle. The front-end carrier is supported on this first longitudinal support plane, which is also referred to as the main longitudinal support plane, via the front strut elements. Furthermore, lateral energy absorption elements are provided, which serve to form a further load plane, are arranged above the first longitudinal support plane and below the upper cross member element, which are connected to the respective front strut element or are integrated into the respective front strut element and which each have a support region which projects rearwardly beyond the respective front strut element in the longitudinal direction of the vehicle. Furthermore, at least one structural component, for example a rear strut element, is provided which can be arranged or is arranged behind the respective energy absorption element, on which structural component the energy absorption element can be supported or is supported by its support region.

The passenger vehicle according to the invention is thus characterized in that, in the region between the first longitudinal support plane having the bumper-flexible cross member and the upper cross member element of the front-end carrier, a further load plane or an additional load path is provided, in which collision-induced forces are introduced or transferred into the body structure of the passenger vehicle and are also reduced by deformation of the energy absorption elements of the additional load plane by means of corresponding energy absorption elements which are also referred to as crash absorbers, crash energy absorbers or crash boxes. The arrangement of the additional load path prevents driving underneath a higher collision partner, i.e., for example, an off-road vehicle whose bumper-flexible cross member is not hit and thus the main longitudinal support plane of the passenger vehicle according to the invention is also not activated. The additional crash structure above the main longitudinal support plane, which are supported by means of front strut elements on this longitudinal support plane arranged below, however, is activated and at least partially absorbs the forces introduced by the collision partner and preferably also ensures a transfer thereof via the front strut elements to the main longitudinal supports arranged below.

In principle, it is possible that an energy absorption element, which can be formed from at least one organic sheet, is integrated into at least one of the front strut elements. In other words, the energy absorption element has at least one organic sheet or is produced using at least one organic sheet.

Due to the energy absorption elements provided in the additional load path, an at least substantially rectangular force-displacement characteristic can be implemented such that accident energy can be absorbed particularly advantageously and in particular guided. In addition, the energy absorption element and thus the front-end carrier can be designed as a whole with lightweight construction since the weight of the energy absorption element and thus of the front-end carrier can be kept low as a whole.

An organic sheet is generally understood to be a fiber composite material which comprises at least one plastic as a matrix or plastic matrix and reinforcing fibers which are embedded into the plastic matrix. The plastic or the plastic matrix is preferably a thermoplastic, such that a particularly high forming capability, in particular hot forming capability, of the organic sheet can be achieved. The organic sheet is, in particular, a fiber-matrix semi-finished product which can be formed similarly to semi-finished sheet products, in particular sheet metal plates. As a result, it is possible for the organic sheet to be formed for the production of the energy absorption element as required and in a cost-effective manner. The reinforcing fibers are preferably glass fibers, aramid fibers, natural fibers and/or carbon fibers.

In an advantageous embodiment of the invention, the organic sheet has a folded structure. By means of such a folded organic sheet structure, for example, a sufficient stiffness of the energy absorption element can be achieved such that an undesirable and, for example, early kinking can be prevented. At the same time, a particularly high energy absorption capacity of the energy absorption element can be shown such that a particularly high amount of accident energy is absorbed or can be absorbed by means of the energy absorption element by deforming the energy absorption element.

It has been found to be particularly advantageous if the organic sheet has a hollow cross-section at least in a partial region. The hollow cross-section can be an open or closed hollow cross-section. As a result, the weight of the energy absorption element and thus of the front-end carrier can be kept low while at the same time achieving the particularly advantageous accident behavior.

A further embodiment is characterized in that the organic sheet is provided with a plastic for stiffening the organic sheet. By providing the organic sheet with a plastic, the organic sheet can be stiffened in a targeted manner as required such that, for example, an undesirable bulging and kinking of the energy absorption element can be avoided during the deformation process. In particular, it is possible to provide the organic sheet with the plastic locally and therefore in a targeted manner and therefore stiffen it locally, such that a low weight is achieved and the accident behavior of the energy absorption element can be adjusted in a targeted manner. By using plastic, it is in particular possible to prevent kinking of the energy absorption element, which acts as a crash absorber, when colliding with an inclined barrier which is inclined, for example, by at least substantially ten degrees. It is also possible to prevent bulging of the energy absorption element.

In order to stiffen the organic sheet or the energy absorption element particularly effectively and in a space-saving manner, in a further embodiment of the invention, provision is made for the plastic to be at least partially accommodated in the hollow cross-section.

It has been found to be particularly advantageous if stiffening ribs are formed by the plastic. As a result, a stiffening structure can be formed, by means of which the organic sheet is stiffened in a particularly weight-efficient and effective manner.

In order to avoid an undesirable kinking and bulging of the energy absorption element during an accident in a particularly safe manner, at least one of the stiffening ribs, for example, extends continuously from a first wall which at least partially delimits the hollow cross-section to an opposing second wall of the organic sheet which at least partially delimits the hollow cross-section, wherein the at least one stiffening rib is supported on these walls or is connected to the walls. As a result, undesirable collapsing of the hollow cross-section can be safely avoided, for example.

In a further embodiment of the invention, it is provided that at least two of the stiffening ribs extend diagonally with respect to one another, in particular crosswise, in order to stiffen the organic sheet in a particularly effective manner.

A further embodiment is characterized in that the plastic is injection molded onto the organic sheet. In other words, the organic sheet is provided with the plastic by means of an injection molding method. As a result, the energy absorption element and thus the front-end carrier can be produced in a particularly cost-effective manner while at the same time achieving particularly advantageous accident behavior.

Finally, it has been shown to be particularly advantageous if the at least one strut element, into which the energy absorption element is integrated, is formed from a plastic. It has been shown to be particularly advantageous here if the strut element is injection molded onto the organic sheet. In other words, it is conceivable to produce the at least one strut element by means of an injection molding process and thus to injection mold or overmold the at least one organic sheet with a plastic, from which the strut element is produced. As a result, the energy absorption element can be integrated into the at least one strut element in a particularly simple and cost-effective manner.

Further advantages, features and details of the invention emerge from the following description of preferred exemplary embodiments as well as with the aid of the drawings.

DETAILED DESCRIPTION OF THE DRAWINGS

Figure 1:
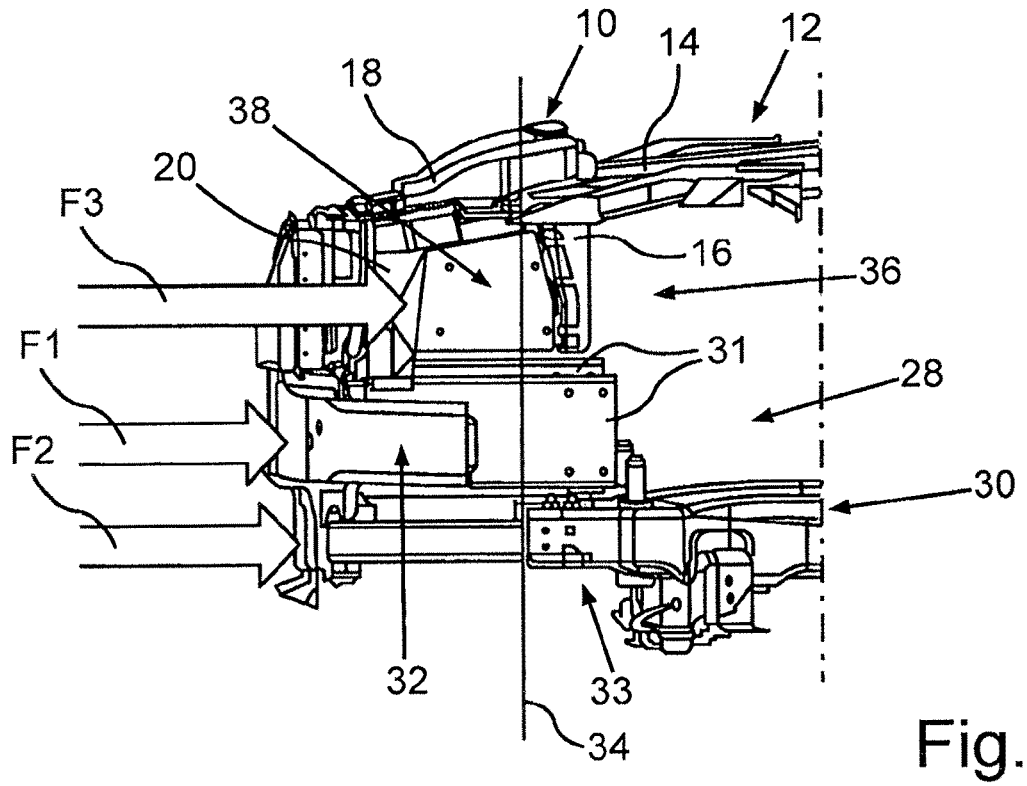
FIG. 1 is a schematic side view of a first exemplary embodiment of a front-end carrier for a passenger vehicle having at least one cross member element and having at least two lateral strut elements which are connected to one another via the cross member element and extend downwards in the vertical direction of the vehicle away from the cross member element, by means of which the front-end carrier can be supported on a first longitudinal support plane of the passenger vehicle.

In the Figures, identical parts and functionally equivalent elements have been provided with the same reference numerals such that the preceding description is referred to in this respect. In the case of identical parts or functionally equivalent elements, which are located on the left-hand side as well as on the right-hand side of the vehicle, the part/element provided on the right-hand side of the vehicle is provided with the same reference numeral but additionally with the index-'-.

FIG. 1 is a schematic side view of a front-end carrier 10 for a passenger vehicle which is arranged in the longitudinal direction of the vehicle in front of a front structure 12 of the passenger vehicle. The front structure 12 comprises a cross member element 14 as well as lateral, rear strut elements, of which a rear strut element 16 can be seen in FIG. 2. The following embodiments of the rear strut element 16 can be readily transferred to the right rear strut element which is not visible in FIG. 2. The rear strut element 16 extends downwards in the vertical direction of the vehicle (z direction) away from the cross member element 14 and is also referred to as a rear Z strut, which can be mounted fixed in the shell, among other things.

The front-end carrier 10, which is formed separately from the front structure 12 and can be fastened or is fastened to the front structure 12, comprises a cross member element 18 which is formed, for example, as a radiator bridge. This means that a cooling module is fastened to the cross member element 18 in the finished state of the passenger vehicle.

Furthermore, the front-end carrier 10 comprises two lateral, front strut elements, of which a left front strut element 20 can be seen in FIG. 1. The following embodiments of the left front strut element 20 can also be easily transferred to the right front strut element of the front-end carrier 10. Here, the front strut elements of the front-end carrier 10 are connected to one another via the cross member element 18 and extend downwards in the vertical direction of the vehicle (z direction) away from the cross member element 18, such that the front strut elements 20 of the front-end carrier 10 are also referred to as front Z struts.

Figure 2:
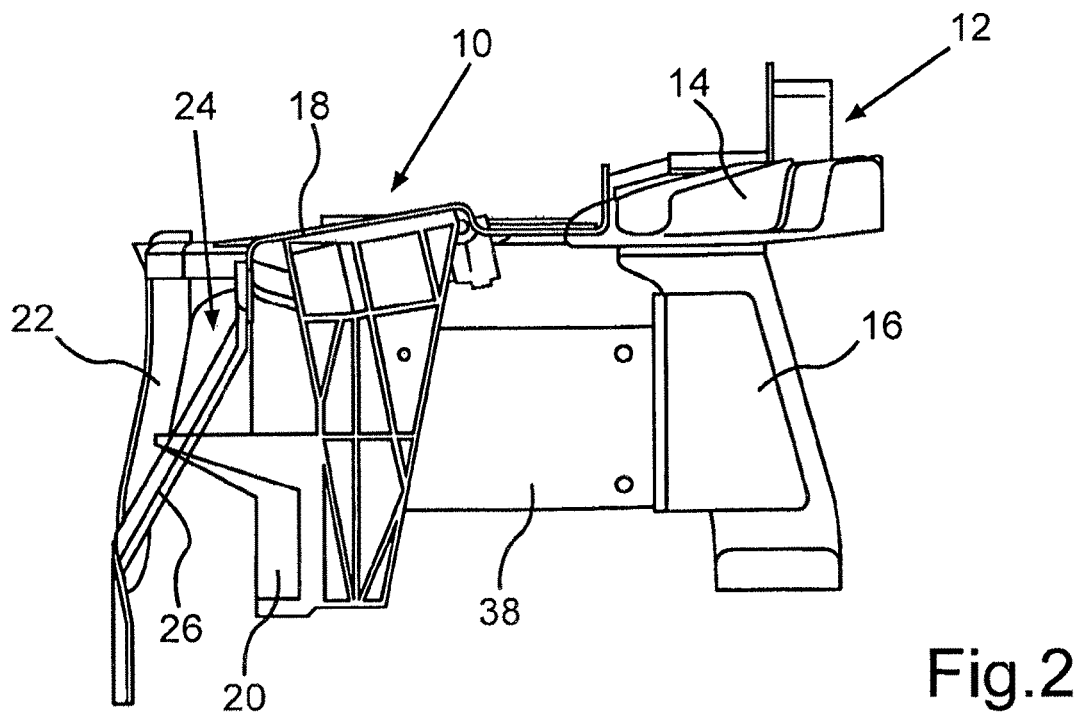
FIG. 2 is a further schematic side view of the front-end carrier according to FIG. 1 having an energy absorption element which is formed separately from the strut elements.

FIG. 2 also shows a central region 22 of the front-end carrier 10, via which, for example, a catch hook for a bonnet of the passenger vehicle is fastened. Furthermore, the central region 22 serves to hold at least one sensor, for example a distance sensor, of the passenger vehicle.

Finally, the front-end carrier 10 comprises a strut arrangement 24 having struts which extend to be at least substantially V-shaped with respect to one another in the exemplary embodiment shown here, of which a left strut 26 can be seen in FIG. 2. The respective struts of the strut arrangement 24 here extend from the respective region of the front Z struts in the direction of the central region 22 and serve to achieve a high stiffness of the front-end carrier 10 such that this has a particularly advantageous noise behavior, which is also referred to as NVH behavior (NVH—Noise Vibration Harshness).

It is clear from FIG. 1 that a first longitudinal support plane 28 is arranged below the front-end carrier 10 in the vertical direction of the vehicle (z direction), in which longitudinal support plane 28 two longitudinal supports, which are not shown in FIG. 1, as well as associated energy absorption elements 31, which can be fastened to these longitudinal supports, are arranged, the energy absorption elements 31 also being referred to as crash boxes. The longitudinal support plane 28 is also referred to as the main longitudinal support plane.

The crash boxes (energy absorption elements 31) of the first longitudinal support plane 28 are at least indirectly connected to a flexible cross member 32 of a bumper of the passenger vehicle which extends at least substantially in the transverse direction of the vehicle. As a result, a first load path can be formed, for example, in the event of a frontal collision of the passenger vehicle, which is illustrated by a force arrow F1 in FIG. 1. By means of this first load path F1, accident-induced loads, i.e., accident energy, can be received and absorbed as well as transferred into subsequent body support structure parts, for example into the longitudinal supports of the first longitudinal support plane 28 and into further shell sections of the vehicle body.

It is clear from FIG. 1 that the front-end carrier 10 is supported on the first longitudinal support plane 28 via the front Z struts. Below the longitudinal support plane 28, which represents a first load plane, a further longitudinal support plane 30 and thus a further load plane are arranged, via which a second load path can be formed. This second load path is illustrated in FIG. 1 by a force arrow F2. In this load path F2, there is also an integral support 33, which is also referred to as a sub-frame or an auxiliary frame and is shown partially in FIG. 1, to which integral support 33 articulation points of wheel suspensions, a drive unit, in particular motor, a gearbox and/or similar are usually fastened on the body side. The integral support 33 is in turn connected or fastened rigidly or via elastomer bearings to the vehicle body, in particular also to the longitudinal supports of the first longitudinal support plane 28 arranged above.

Accident-induced loads can also be absorbed and supported via the lower longitudinal support plane 30. Such accident-induced loads occur, for example, in the event of a frontal collision at low speed, i.e., a so-called repair crash. The so-called repair crash plane is referred to in FIG. 1 with reference numeral 34 and marks an imaginary deformation border in the longitudinal direction of the vehicle (x direction), behind which, according to the depiction of FIG. 1 to the right of it, no damage should occur to the shell structure of the vehicle body during a repair crash. The so-called "lower stiffener", i.e., the stop region of a pedestrian in the event of a collision with the passenger vehicle, is also located in or at the level of the lowest longitudinal support plane 30, who is supported by the "lower stiffener" in the lower leg region, usually above their ankle and below their knee which is supported at the level of the main longitudinal support plane 28 in such a way that a large knee bending angle and a running over of the pedestrian by the vehicle can be avoided.

According to FIG. 1 and FIG. 2, lateral energy absorption elements are used on the front-end carrier 10 to achieve a third load plane 36, of which a left energy absorption element which is referred to with 38 can be seen in FIG. 1 and FIG. 2. The following embodiments of the left energy absorption element 38 can also be transferred to the right energy absorption element, which is not visible in FIG. 1 and FIG. 2. A third load path, which is illustrated by a force arrow F3, can be formed in the event of a frontal collision via the third load plane 36. This third load plane 36 is thus located above the main longitudinal support plane 28 and below the upper cross member element 18, in particular the radiator bridge, of the front-end carrier 10 and serves in particular to ensure that the passenger vehicle does not drive under in the event of a frontal collision of the passenger vehicle according to the invention with a vehicle having high ground clearance and/or a high slope angle, for example a so-called off-road vehicle, pickup truck or other SUV. This means that, due to the comparatively low front structure of the passenger vehicle according to the invention, its main longitudinal support plane 28 is not directly activated or is not directly activated to a sufficient extent by the corresponding support structures of the high off-road vehicle, which can lead to increased occupant loads in addition to driving under the off-road vehicle.

The energy absorption element 38 is also referred to as a deformation element or crash absorber, which is applied with accident energy in the event of a frontal collision and can be deformed during energy absorption. According to FIG. 1 and FIG. 2, the respective energy absorption element of the third load plane 36 is formed separately from the front Z struts (strut element 20) and connected to these. Here, the energy absorption element 38 is formed, for example, from a metallic material and, in the present case, as an extruded profile. By means of this separate design of the energy absorption element 38 from the corresponding, front strut element 20, these can be produced from different materials.

Figure 3:
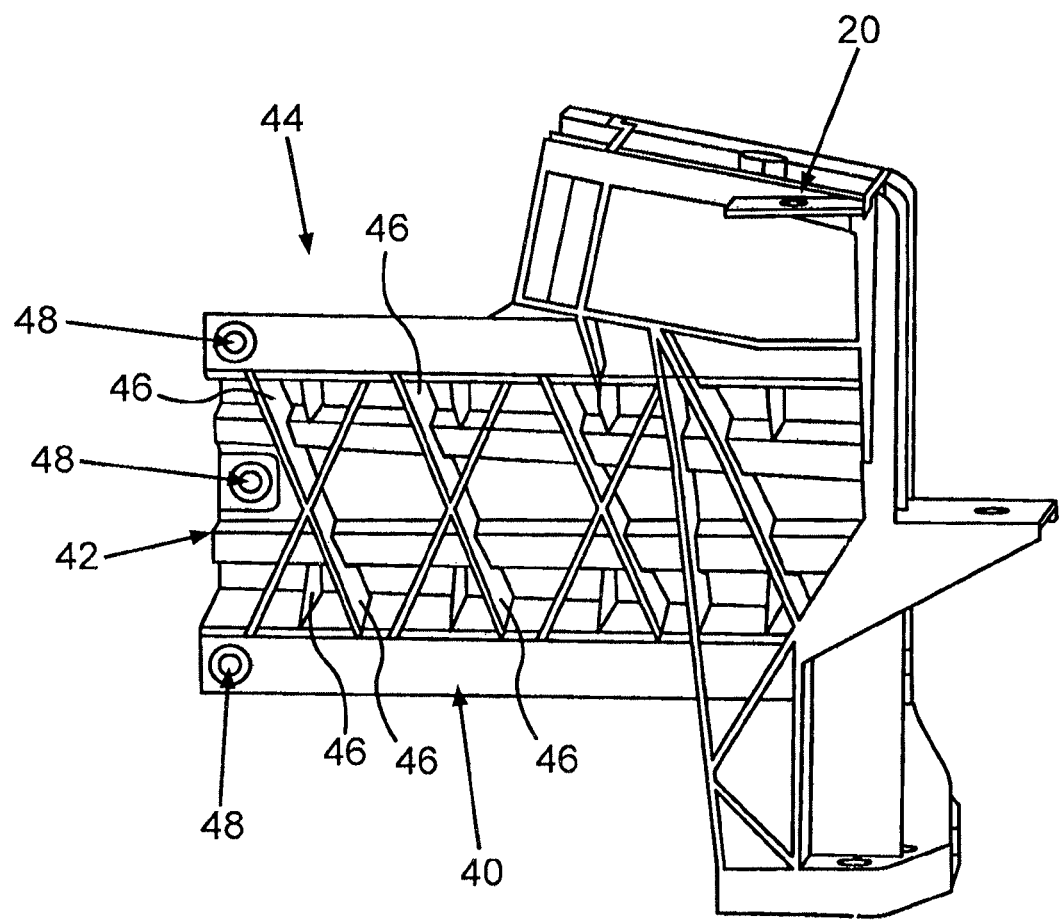
FIG. 3 is a schematic side view of a further embodiment of one of the strut elements, into which an energy absorption element is integrated.

In order to further develop the front-end carrier 10 in such a way that particularly advantageous accident behavior, in particular in the event of a frontal collision, can be achieved, as is illustrated by FIG. 3, an energy absorption element 40 is integrated into the strut element 20, i.e., into the respective front Z strut, the energy absorption element 40 preferably being produced from plastic material and having reinforcing or stiffening inserts, for example made from metal, if necessary. In one advantageous embodiment, provision is made for the respective energy absorption element 40 to be formed, i.e., produced, from at least one organic sheet and thus from a fiber-reinforced and, in particular, thermoplastic material. By integrating the energy absorption element 40 into the strut element 20, a particularly early and extensive energy absorption can be achieved in the event of a frontal collision by deformation of the energy absorption element 40.

Integrating the energy absorption element 40 into the strut element 20 is understood to mean that the strut element 20 (front Z strut) and the energy absorption element 40 (crash energy absorber) are connected to form a common part or to form a common component unit. As a result, an additional, upper load path can be created in addition to the longitudinal support planes 28 and 30, by means of which accident energy can be absorbed particularly early and extensively as well as in particular at least substantially homogeneously. In particular, it is possible to use the front strut element 20 for a particularly early activation of the energy absorption element 31.

It can be seen in FIG. 3 that the organic sheet or the energy absorption element 40 has a folded structure such that a sufficient stiffness can be achieved. In this context, the term "folded structure" is understood to mean that the organic sheet is not formed to be flat over the entire surface, but has a stepped, angled course, as seen in the cross-section, as a result of which quasi beads, grooves and similar are formed. Furthermore, the organic sheet has, at least in a partial region, a hollow cross-section 42, which in the present case is formed as an open hollow cross-section.

Alternatively, it is conceivable for the energy absorption element 40 to be formed with a shell design and, in this case, to have at least two shell elements which are connected to one another, which are connected to one another by forming at least one closed hollow cross-section. In the present case, the energy absorption element 40 is designed with a single shell or is formed by a single-shell organic sheet element.

The organic sheet is formed from a fiber-reinforced plastic and thus comprises a plastic, by means of which a plastic matrix is formed. This plastic is preferably a thermoplastic, in particular polyamide such as, for example, PA6. Furthermore, the organic sheet comprises reinforcing fibers which are embedded into the plastic matrix. For example, the reinforcing fibers are glass fibers. Alternatively or additionally, it is conceivable for the reinforcing fibers to be formed as aramid fibers and/or carbon fibers.

The organic sheet is, for example, a fiber-matrix semi-finished product consisting of at least one fiber web or fiber layer, which can be introduced into a forming tool in the inherently rigid state and can be formed in a particularly simple manner by means of the forming tool. In this case, it is possible to form the organic sheet similarly to a sheet metal material or a sheet metal plate, such that the energy absorption element 40 can be produced in a particularly simple and cost-effective manner.

In order to achieve a particularly high energy absorption capacity and to prevent an undesirable kinking of the energy absorption element 40 in the event of a frontal collision, the organic sheet is provided with a plastic for stiffening the organic sheet. Here, the plastic is injection molded onto the organic sheet. In other words, the plastic is, for example, injection molded onto the organic sheet by means of an injection molding process.

In a particularly advantageous and cost-effective production method of the energy absorption element 40, provision is made for the organic sheet to be hot formed in a tool and the Z strut and the ribs are also injection molded immediately afterwards in the same tool in a subsequent process step. Therefore, the organic sheet does not necessarily have to be formed first and then be overmolded in a second tool.

It is clear from FIG. 3 that the strut element 20 is formed by the plastic, which is injection molded as an injection compound onto the organic sheet. The plastic is preferably formed as a fiber-reinforced plastic, wherein the plastic also comprises a plastic matrix, in particular a thermoplastic, and reinforcing fibers. The plastic matrix is preferably a thermoplastic, for example polyamide (PA). The plastic is preferably PA6 GF30. This means that reinforcing fibers are embedded into the plastic in the form of glass fibers. Alternatively or additionally, it is conceivable for further or other reinforcing fibers such as, for example, carbon fibers and/or aramid fibers to be embedded into the plastic.

The energy absorption element 40 has a support region 44 which projects rearwardly in the longitudinal direction of the vehicle beyond the front strut element 20, with which support region 44 the energy absorption element 40 can be supported on a structural component arranged behind it, in particular on the cross member element 14.

In addition, the plastic is at least partially accommodated in the hollow cross-section 42, whereby the energy absorption element 40 or the organic sheet is stiffened in the region of the hollow cross-section 42. By providing the organic sheet with the plastic locally, the organic sheet can be stiffened in a targeted manner as required such that an undesired bulging and kinking of the energy absorption element 40 can be avoided.

FIG. 3 also shows that stiffening ribs 46 are formed by the plastic in the hollow cross-section 42, wherein the stiffening ribs 46 each extend continuously from a first wall of the organic sheet to an opposing, second wall and are thereby supported on the respective walls. Furthermore, two of the stiffening ribs 46 form a stiffening rib pair in each case, wherein the stiffening ribs 46 of such a stiffening rib pair extend diagonally with respect to each other and in the present case crosswise. As a result, the organic sheet is stiffened in a particularly weight-efficient manner. In other words, an injection molded ribbing is created by the reinforcing ribs 46, by means of which an undesirable bulging or deformation of the energy absorption element 40 is prevented in a cost-effective manner.

The plastic is, for example, connected to the organic sheet in a positive-locking manner. Alternatively or additionally, it is conceivable for the plastic to be connected to the organic sheet in a material-locking manner. In this case, for example, the plastic is connected to the plastic matrix of the organic sheet in a material-locking manner by, for example during injection molding, the plastic matrix of the organic sheet being lightly melted or fused such that the melted plastic matrix of the organic sheet can be connected to the injection compound which is initially still liquid in a material-locking manner. As a result, a particularly strong bond between the plastic and the organic sheet can be achieved.

Furthermore, the energy absorption element 40 has limiting elements 48, which are also referred to as "compression limiters". In the event of a frontal collision, the energy absorption element 40 is deformed, in particular swaged or compressed, by energy dissipation. The limiting elements 48 serve to limit this swaging or compression of the energy absorption element.

Overall, it can be seen that the energy absorption element 40, which is integrated into the strut element 20, is formed from a folded organic sheet structure having injection molded ribbing, whereby particularly advantageous accident behavior can be achieved in a weight-effective manner.

It should be noted that the energy absorption element 40 and the front strut element 20 in principle consist of different materials and can be connected to each other to form a component. This connection between these parts can in principle take place in a force-locking, positive-locking and/or material-locking manner. In principle, material combinations are also conceivable in the form that the front strut element 20 is produced from a metal material and the energy absorption element 40 is produced from a plastic material or the front strut element 20 consists of a plastic material and the energy absorption element 40 consists of a metal material. It is important that the front strut element 20 and the energy absorption element 40 are designed in such a way that the forces—preferably analogously to the main longitudinal support plane 28—are absorbed correspondingly, i.e., by deformation of at least the energy absorption element 40, in the event of a collision-induced force application of the third load plane 36 and otherwise transferred into the body support structure.

Figure 4:
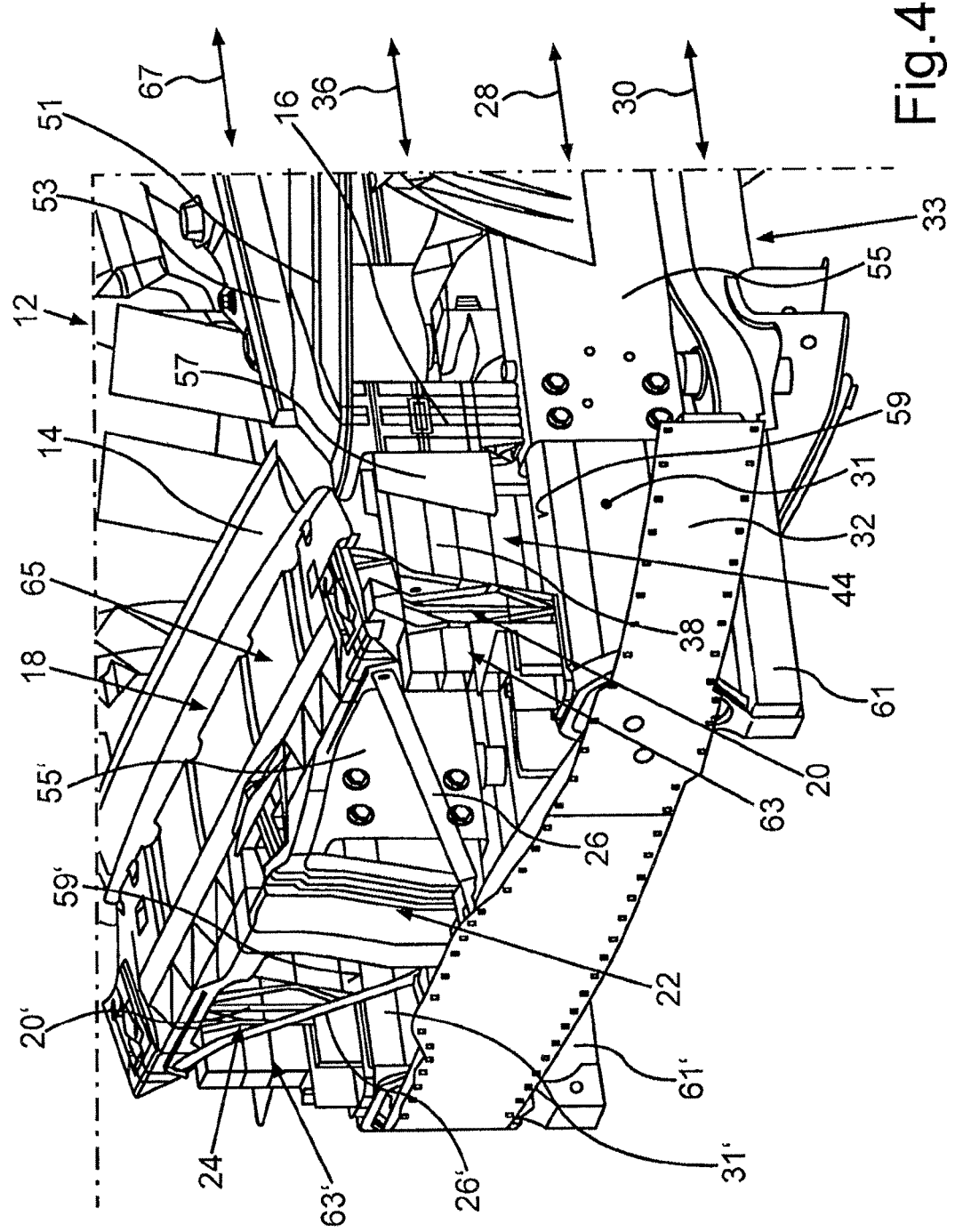
FIG. 4 is a perspective view of a second exemplary embodiment of the front-end carrier according to the invention.

FIG. 4 shows a perspective view of a section of a passenger vehicle in its front region with a further exemplary embodiment of the front-end carrier 10. The front structure 12 of the passenger vehicle comprises a cross member element 14, to the end of which an upper strut element 51 is connected respectively, which connects the cross member element 14 to the wing supports which cannot be seen in the depiction according to FIG. 4, to which a wing can be fastened in each case. Of the upper strut elements 51, only the strut element 51 provided on the left-hand side of the passenger vehicle can be seen. The wing supports are supported rearwardly in each case by means of a further upper strut element 53 on a spring-strut dome, also referred to as a damper dome. The upper strut elements 51, 53 lie at least substantially in the same imaginary horizontal (xy) plane, which spans in the longitudinal direction of the vehicle (x direction) and transverse direction of the vehicle (y direction), as the rear cross member element 14 and the front cross member element 18 (radiator bridge).

FIG. 4 also shows longitudinal supports 55, 55' of the first longitudinal support plane 28, also referred to as the main longitudinal support plane, to which the respective energy absorption element 31 or 31' is fastened, here in each case by means of several screw connections. For this purpose, the energy absorption elements 31, 31' are inserted into the longitudinal supports 55, 55' on the end side and are subsequently screwed.

The rear strut elements, of which even in the depiction according to FIG. 4 only the strut element 16 provided on the left-hand side of the front structure can be seen, are formed here as Z struts in the form of elongated brackets extending downwards in the vertical direction of the vehicle (z direction) away from the cross member element 14, the strut elements 51 or the connecting region between these components. A receiver 57 for introducing and, if necessary, fastening the respective energy absorption element 38 of the third load plane 36 is provided in each case on the rear strut elements 51. For this purpose, the receiver 57, which is provided on the side of the rear strut element 16 facing towards the energy absorption element 38, is formed to be U-shaped in this exemplary embodiment. The side walls of the receiver 57 laterally delimit the energy absorption element 38 and, in the event of a collision, prevent a lateral evasion of the energy absorption element 38 when force is applied to the third load plane 36 and ensure a reliable support thereof. It can also be seen that the rear strut elements 16 are arranged in the longitudinal direction of the vehicle at the level of the longitudinal supports 55, 55' and are fastened thereto, and thus in a region of the body over structure which is not yet damaged in the event of a repair crash.

The front-end carrier 10 is supported by the front Z struts (strut elements 20, 20') on the first main longitudinal support plane 28, wherein the front Z struts are connected to the energy absorption elements 31 (crash boxes) and, for example, are supported on an upper side 59 or 59' of the crash boxes, said upper side facing upwards in the vertical direction of the vehicle.

From the lower longitudinal support plane 30, in which the integral support 33 is located, among other things, respective longitudinal supports 61 and 61' can be seen, which are spaced apart from one another in the transverse direction of the vehicle.

In the exemplary embodiment according to FIG. 4, each energy absorption element 38 is integrated into the respective front Z strut (front strut element 20 or 20'). This means that the respective front Z strut and the respective energy absorption element 38 are formed by a common component, for example a common injection molded part or cast part. Integrating the energy absorption element 38 into the respective front Z strut is understood to mean that the respective front Z strut and the respective energy absorption element 38 are in particular formed as one piece with each other. In a preferred embodiment, it is provided that these components are produced from plastic material.

In the exemplary embodiment according to FIG. 4, the respective energy absorption element 38 extends not only in the region or free space between the front strut elements 20, 20' and rear strut elements 16, but also has a longitudinal section 63 or 63' which, in the direction of travel in front of the respective front strut element 20, 20', projects away from this towards the front. This makes it possible, in particular, to be able to select the position of the respective front Z strut in the longitudinal direction of the vehicle more freely and yet still ensure a particularly early activation of the respective energy absorption element 38.

In the exemplary embodiment according to FIG. 4, the cross member element 18 of the front-end carrier 10 is formed as a flat, plate-shaped component, into which a crash structure is integrated or is formed thereon, which can be deformed, for example, in the event of a frontal collision by energy dissipation. The crash structure is formed, for example, as a rib and/or honeycomb structure and therefore comprises a plurality of ribs and/or honeycombs, by means of which a particularly high energy absorption capacity can be achieved in a weight-efficient manner. By integrating a crash structure into the cross member element 18, an energy absorption element 65 and thus an additional upper fourth load plane 67 are created, which are schematically indicated by means of a double arrow like the other three load planes 28, 30, 36. This fourth load plane 67 extends not only over lateral regions of the front structure, but rather extends over a substantial part of the vehicle width between the front Z struts (strut elements 20, 20'). In other words, an additional energy absorption in the region between the front Z struts can be achieved by means of the energy absorption element 65, such that a particularly high amount of accident energy can be absorbed by means of the front-end carrier 10. In order to be able to be deformed in an energy-absorbing manner in the event of a crash, the cross member element 18 or its crash structure/the energy absorption element 65 is supported on its rear transverse edge on the rear cross member element 14.

According to a second exemplary embodiment of the invention, the cross member element 18 and the energy absorption element 65 are two parts which are formed to be separate from each other and are connected to each other for the formation of a cross member and energy absorption structure between the two Z struts 20, 20'. It is thus conceivable for the cross member element 18 to be formed as a separate component consisting of metal, in particular as a hollow profile component, which is, for example, screwed to the energy absorption element 65 which is preferably formed as a plastic part. An advantage of the multiple parts of this cross member structure, irrespective of its production and material, is that a displacement of these two components in the Z direction is possible for the purpose of the height alignment thereof.

In a third exemplary embodiment of the invention, the energy absorption element 65 is injection molded onto the cross member element 18 which also consists of plastic or alternatively of metal or a hybrid material.

The abovementioned crash structure is formed, for example, by a plastic which is processed, for example, by means of an injection molding process. Here, the cross member element 18 can, for example, comprise a carrier part which extends at least substantially in the transverse direction of the vehicle, in particular made from a metallic material, wherein the plastic forming the crash structure is injection molded onto the carrier part during the injection molding process. Alternatively or additionally, it is possible for the cross member element 18 or the energy absorption element 65 to have at least one organic sheet or a (short) fiber-reinforced one, which is provided with the plastic and is thereby stiffened. The accident behavior and the energy absorption capacity of the energy absorption element 65 can thus be adjusted in a targeted manner as required.

Figure 5:
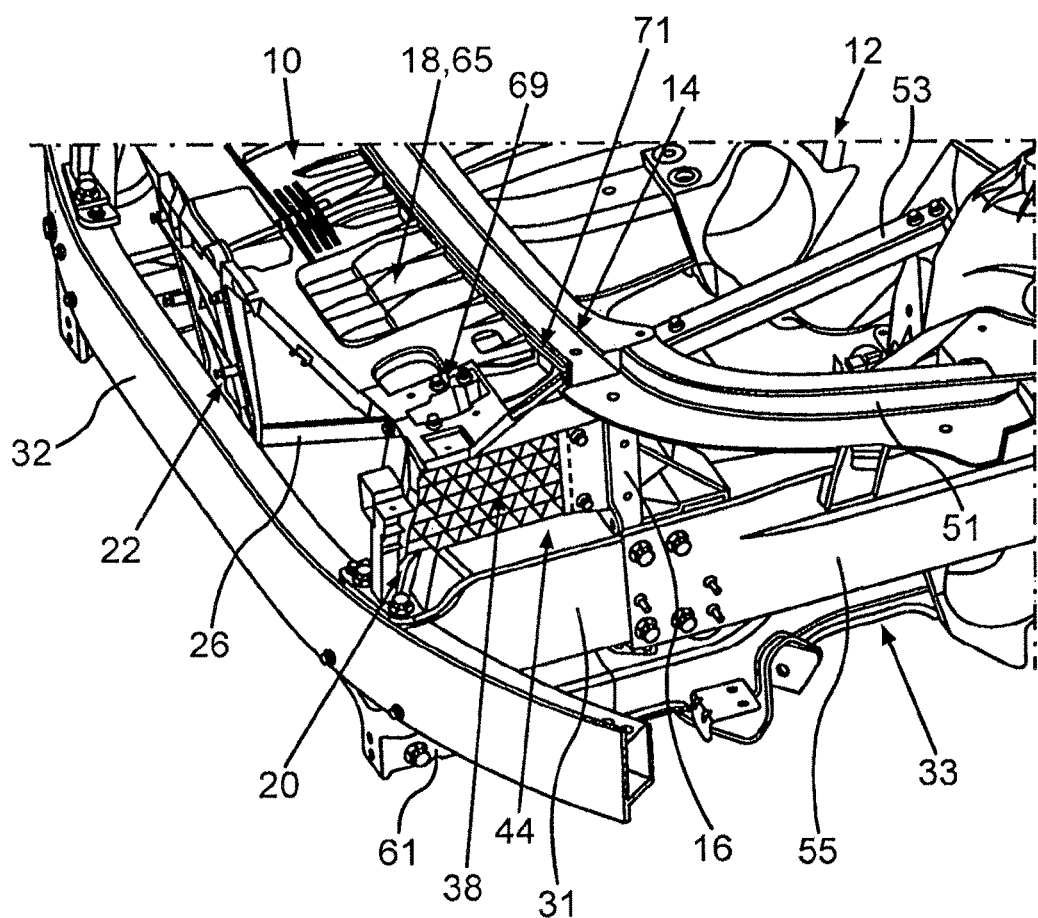
FIG. 5 is a perspective view of a third exemplary embodiment of the front-end carrier according to the invention.

FIG. 5 shows a perspective view of a section of a passenger vehicle in its front region with a further exemplary embodiment of the front-end carrier 10. The respective front strut element 20 or 20' is also formed here as one piece with the respective energy absorption element 38, preferably made of plastic material. Here, the energy absorption element 38 has a honeycomb-like structure, which is achieved by means of a corresponding cross-rib structure.

Unlike the exemplary embodiment according to FIG. 4, the front strut elements 20, 20' are arranged significantly further forwards in the direction of travel, in this case at the level of the bumper-flexible cross member 32 and fastened thereto, as is the case for the energy absorption element 31 of the first longitudinal support plane. In this exemplary embodiment, the energy absorption element 38 thus extends at least substantially completely between the front and rear strut elements 20 and 16 or 20' and 16'. It can also be seen that the upper cross member element 18 of the front-end carrier 10 is connected to the front strut elements 20, 20' by means of fastening means 69. Another difference with respect to the exemplary embodiment according to FIG. 4 consists in the design of the rear strut elements 16, which substantially only have a different shape here, but are functionally identical, and serves to rearwardly support the energy absorption element 38 and to support the rear cross member element 14 and/or of the upper strut element 51 formed as a sheet metal component. The rear cross member element 14 is formed here as a hollow profile. The energy absorption element 38 and the rear cross member element 14 are connected to each other by means of fastening means 71, which is explained in more detail below with the aid of FIG. 6.

In a preferred embodiment, the rear strut elements 16 are at least indirectly connected above to the cross member element 18 and/or the upper strut element 51, such that on the whole an extremely stable frame construction results, which is open towards the bottom in the direction of the road and is connected to or integrated into the body shell such that the support of the energy absorption elements 38 in the third load plane 36 and, if necessary, the energy absorption element 64 arranged above is ensured during its/their energy-absorbing deformation without failing and kinking towards the rear.

Figure 6:
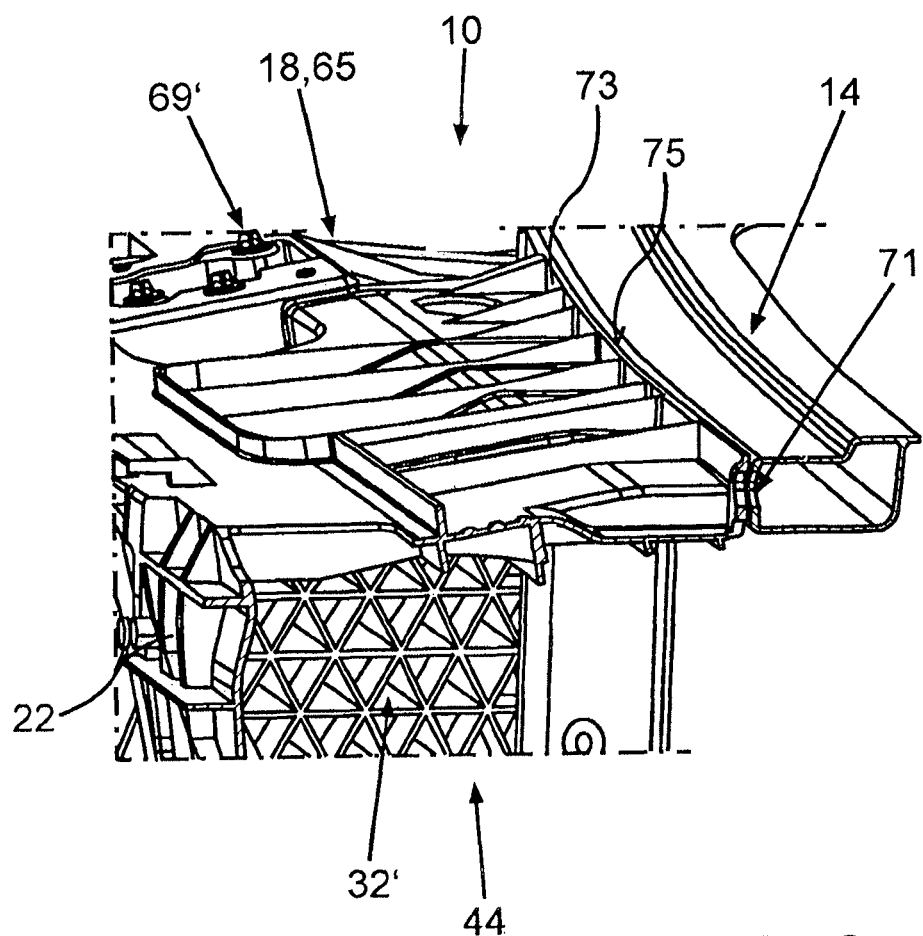
FIG. 6 is an enlarged section of the front-end carrier according to FIG. 5.

FIG. 6 shows an enlarged view of a section of the front-end carrier 10 according to FIG. 5, partially cut at the level of the central part 22 of the front cross member element 18. The flat, front cross member element 18 which is provided with stiffening longitudinal and transverse ribs and has an integrated energy absorption element 65 can be seen. The cross member element 18 has a wall 73 running in the vertical direction on its rear transverse edge region, the wall 73 having a contact surface 75 on which the cross member element 18 lies flat in the mounted state on the cross member element 14 and is supported on this in the event of a collision-induced force application. The two cross member elements 18 and 14 are detachably and non-destructively connected to each other by means of fastening means 71, for example screw elements or similar. For this purpose, the cross member elements here have, purely by way of example, openings which are aligned with one another, with which a fastening means 71 engages.

All of the embodiment variants described above of the passenger vehicle according to the invention have in common that the body shell, i.e., the support structure of the motor vehicle, has an additional load plane 67 which is arranged below the radiator bridge (front cross member element 18) and above the bumper flexible cross member 32 and thus also the main longitudinal support plane 28. In the case of particularly flat motor vehicles, this serves to avoid driving under a high collision partner and to ensure the early activation of the crash structure of the motor vehicle in its front region such that the loads acting on the occupants are reduced by a desired energy-absorbing deformation of the crash absorber elements, provided on the front-end carrier and the remaining load planes 67, 30, 28, in particular of the energy absorption elements 32, 38 as well as at least some of the longitudinal supports and strut elements provided in the front structure. For this additional shell-side crash structure of the third load plane 36, front and rear strut elements (z struts) of different embodiments can be used. Likewise, energy absorption elements 38 in a wide variety of forms.

The invention claimed is:

1. A passenger vehicle, comprising:
a front-end carrier which has a cross member element and two lateral front strut elements, wherein the two lateral front strut elements are connected to one another via the cross member element and extend downward in a vertical direction of the passenger vehicle away from the cross member element;
a first longitudinal support plane which is disposed below the front-end carrier in the vertical direction of the passenger vehicle, wherein lateral longitudinal supports and energy absorption elements are disposed in the first longitudinal support plane, wherein the energy absorption elements are at least indirectly connected to a flexible cross member of a bumper, wherein the flexible cross member extends at least substantially in a transverse direction of the passenger vehicle, and wherein the front-end carrier is supported on the first longitudinal support plane via the two lateral front strut elements;

lateral energy absorption elements which form a further load plane, wherein the lateral energy absorption elements are disposed above the first longitudinal support plane and below the cross member element, wherein the lateral energy absorption elements are each connected to a respective one of the two lateral front strut elements or are integrated into the respective one of the two lateral front strut elements, and wherein each of the lateral energy absorption elements have a support region which projects rearwardly beyond the respective one of the two lateral front strut element in a longitudinal direction of the passenger vehicle; and a structural component, wherein the structural component is disposed behind the lateral energy absorption elements and wherein the lateral energy absorption elements are supported on the structural component.

2. The passenger vehicle according to claim 1, wherein a respective one of the two lateral front strut elements and a respective one of the energy absorption elements are formed as one piece.

3. The passenger vehicle according to claim 2, wherein a respective one of the two lateral front strut elements and a respective one of the energy absorption elements are formed by a common cast part or a plastic part.

4. The passenger vehicle according to claim 1, wherein a respective one of the two lateral front strut elements and a respective one of the energy absorption elements are formed by casting.

5. The passenger vehicle according to claim 1, wherein the structural component is a rear strut element which is mounted fixed in a shell.

* * * * *